May 11, 1926.
F. L. KOEPKE
FISH LURE
Filed March 23, 1925
1,584,100
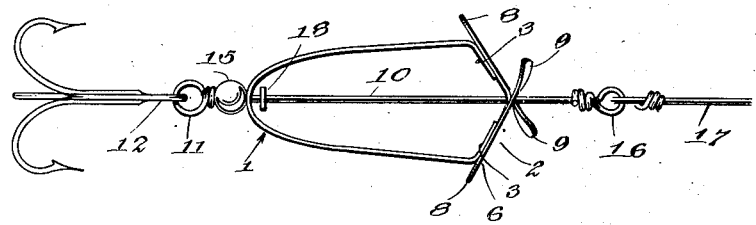
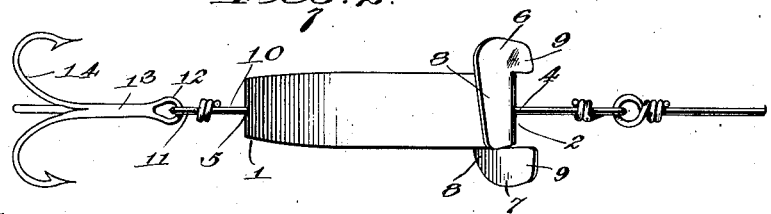
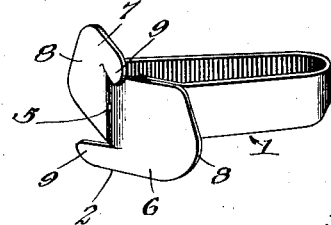
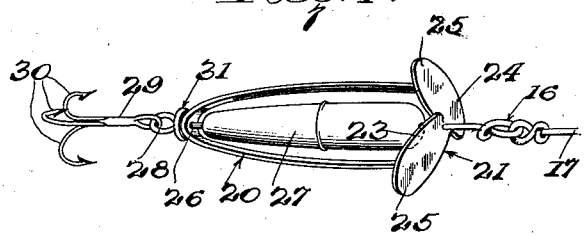
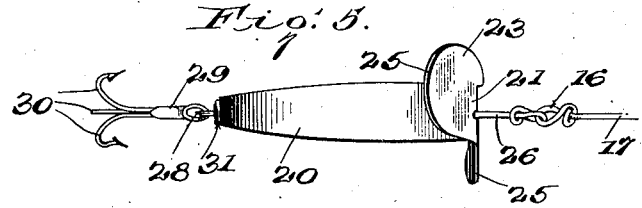
WITNESSES
INVENTOR
Frank L. Koepke
BY
ATTORNEYS Patented May 11, 1926.

1,584,100

UNITED STATES PATENT OFFICE.

FRANK L. KOEPKE, OF RIDGEFIELD, WASHINGTON.

FISH LURE.

Application filed March 23, 1925. Serial No. 17,785.

My invention relates to improvements in fish lures of the type adapted to spin or rotate when drawn through the water, as in trolling, or when held in a swiftly moving stream of water against movement with the current of the stream, and it consists in the combinations, constructions and arrangements herein described and claimed.

An object of the invention is the provision of a fish lure of the character described which will spin at a relatively high speed and which will offer but relatively little resistance to its movement through the water.

A further object of the invention is the provision of a lure of the character described which will spin in the water without any "churning" action.

A further object of the invention is the provision of a lure of the character described which is economical to manufacture, can be highly polished to render it particularly attractive to fish, and is not likely to get out of order or to be impaired in the service for which it is intended.

Other objects and advantages of the invention will be apparent from the following description, considered in conjunction with the accompanying drawings, in which—

Figure 1 is a plan view of a fish lure embodying the invention,

Figure 2 is a side elevation of the fish lure,

Figure 3 is a perspective view of the body of the fish lure,

Figure 4 is a perspective view of a modified form of fish lure embodying the invention, Figure 5 is a side elevation of the modified form of fish lure.

In Figures 1 to 3 inclusive I show the fish lure body as comprising a trailing portion 1 and a body spinning head portion 2. The trailing portion 1 is formed of a single strip of light gauge metal bent transversely intermediate its ends substantially to V-shape. The head portion 2 likewise is formed of a strip of light gauge metal bent transversely intermediate its ends into angular shape. The arms of the trailing portion 1 are bent inwardly adjacent to their extremities to provide attaching portions 3 which are secured flatwise against the inner faces of the arms of the head portion 2 by means of solder or in any other suitable known manner, the arrangement being such that a central opening 4 through the head portion 2 at the juncture of the arms of the head portion will be in alignment with a central opening 5 through the trailing portion 1 at the juncture of the arm of the trailing portion. The outer or contact faces of the arms of the head portions 2 diverge from the forward end of the body of the lure and lie in planes which not only extend obliquely to the longitudinal axis of the body but also obliquely to a plane which extends longitudinally of the body along the longitudinal median line of the arms of the trailing portion 1. The respective arms of the head section 2 extend at opposite sides of the body beyond the planes of the corresponding longitudinal edges of the trailing portion 1 as indicated at 6 and 7 respectively and the end portions of the respective arms of the head portion 2 extend rearwardly and outwardly beyond the arms of the trailing portion 1, as indicated at 8. The arms of the head portion 2 are formed with the lateral extensions prolonged beyond the line of juncture of the arms, thus producing forwardly and outwardly extending prolongations 9 at the forward end of the body, these prolongations 9 diverging forwardly from the line of juncture of the arms of the head portion 2 and being spirally twisted in opposite directions as shown.

A shaft 10 which may be a straight length of wire extends rather loosely through the aligned openings 4 and 5 and is provided at its rearward end with an eye 11 which is engaged with an eye 12 at the forward end of a shank 13 which carries the hooks 14. A bearing bead 15 which may be colored glass or other suitable material is disposed on the shaft 10 between the rearward ends of the trailing portion 1 and the eye 11 for limiting the longitudinal movement of the body of the lure on the shaft 10 toward the hook. The shaft 10 is provided at its forward end with an eye 16 whereby it can be attached to a line 17 and a stop collar 18 may be secured on the shaft 10 between the arms of the trailing portion 1 if desired to limit the forward movement of the body of the lure on the shaft.

From the foregoing description of the various parts of the device, the operation thereof may be readily understood. The head portion 2 acts in the manner of a propeller when in engagement with the water through which the body of the lure is drawn to cause rapid spinning or rotation of the body in the water. While this spinning of the body of the lure is caused by the contact of water which moves relatively to the lure with the arms of the head portion 2 and the lateral and rearward extensions thereof and the forward prolongations thereto over practically the entire area of such outer faces of the arms of the head portion and their extensions and prolongations, it is obvious that the provision of the lateral extension at opposite side edges of the arms of the head portion and the provision of the forwardly divergent oppositely twisted prolongations at the juncture of the arms of the head portion 2 will render the arms of the head portion 2 highly efficient as means for causing the body of the lure to spin at a high degree with but very little resistance to the forward movement of the body of the lure when the lure is drawn through the water, as in trolling. The arms of the head portion 2 deflect the water which impinges against the head portion 2 outwardly and rearwardly and since the trailing portion 1 is wider at its forward end and is of less area at its forward end than the rearward portion of the head portion 2, it will be manifest that practically all the resistance which the lure offers to forward movement of the body of the lure in the water will arise from the contact of the water with the head portion 2 and that the peculiar shape and arrangement of the parts of the head portion 2, as hereinbefore described, preclude any considerable resistance to the forward movement of the fish lure in the water because of contact of the water with the outer faces of the head portion 2. The arms of the trailing portion converge toward the rearward end of the body and therefore should the trailing portion of the body be grasped in the mouth of a fish, as very likely will occur, the jaws of the fish will slide rearwardly along the converging arms of the trailing portion 1 toward the hooks.

The body of the lure is made of any metal or other suitable material which can be highly polished and which will not corrode or be otherwise impaired when the device is used in the service for which it is intended.

In the modified form of the fish lure shown in Figures 4 and 5, the arms of the trailing portion 20 of the body of the fish lure are curved convexly longitudinally thereof. The trailing portion 20 is identical with the trailing portion 1 of the first described form of the lure in all other essential respects. The head portion of the body of the modified form of lure is designated 21 and is substantially the same as the head portion 2 of the preferred form of the device but does not have any forwardly divergent prolongations similar to the prolongations 9 at the juncture of the arms of the head portion. The arms of the trailing portion are joined at their extremities to the arms of the head portion 21. The arms of the head portion 21 are formed with oppositely extending lateral extensions 23 and 24 respectively which are similar to the lateral extensions 6 and 7. The head portion 21 also is formed with the end extensions 25 at the ends of the arms of the head portion, the end extensions 25 being similar to the end extension 8. A shaft 26 similar to the shaft 10 extends loosely through aligned openings in the middle portions of the head and trailing portion of the body of the modified form of lure. A float 27 may be disposed on the shaft 26 between the head and trailing portions of the body of the lure. The shaft 26 is adapted at its rearward end, as at 28 for connection with a shank 29 which carries the hooks 30. A stop bearing 31 is supported on the shaft 26 between the trailing portion 20 and the rearward end of the shaft 26.

The operation of the modified form of the fish lure is identical in essential respects with the hereinbefore described operation of the preferred form of fish lure and therefore need not be set out in detail herein. Obviously, the invention is susceptible of embodiment in forms other than those which have been illustrated in the accompanying drawings and I therefore consider as my own all such modifications and adaptations thereof as fairly fall within the scope of the appended claims.

I claim:

1. A fish lure comprising a body having oppositely disposed angular trailing and head portions, the arms of the trailing portion being secured at their ends against the inner faces of the arms of the head portion and said trailing and head portions having aligned central openings through which a shaft may extend.

2. A fish lure comprising a body having oppositely disposed angular trailing and head portions, the arms of the trailing portion being secured at their ends against the inner faces of the arms of the head portion and said trailing and head portions having aligned central openings through which a shaft may extend, the respective arms of the head portion having lateral extensions at opposite side edges thereof.

3. A fish lure comprising a body having oppositely disposed angular trailing and head portions, the arms of the trailing portion being secured at their ends against the inner faces of the arms of the head portion and said trailing and head portions having shaft may extend, the outer faces of the arms shaft may extend, the outer faces of the arms of the head portion lying in planes extending obliquely to the longitudinal median line of the body and also obliquely to a plane extending along the longitudinal median lines of the arms of the trailing portion.

4. A fish lure comprising a substantially V-shaped trailing portion formed of a strip of light gauge metal, an angular head portion, the arms of the trailing portion being secured at their extremities to the inner faces of the arms of the head portion, said trailing and head portions having aligned central openings, and a shaft extending loosely through said aligned central openings for connecting a fish line with a hook.

5. A fish lure comprising a body having oppositely disposed angular trailing and head portions, the arms of the trailing portion being secured at their ends against the inner faces of the arms of the head portion and said trailing and head portions having aligned central openings through which a shaft may extend, the outer faces of the arms of the head portion lying in planes extending obliquely to the longitudinal median line of the body and also obliquely to a plane extending along the longitudinal median lines of the arms of the trailing portions, said head portion having the lateral extensions thereof prolonged beyond the line of juncture of the arms of the head portion, said prolongations being spirally and reversely twisted.

FRANK L. KOEPKE.